Aug. 20, 1935.   M. N. STATES   2,012,112
THERMOMETER
Filed May 16, 1932

Inventor
Marshall N. States
By Gibson, Mann &Co
Attys.

Patented Aug. 20, 1935

2,012,112

UNITED STATES PATENT OFFICE 2,012,112

THERMOMETER

Marshall N. States, Evanston, Ill., assignor to Central Scientific Company, a corporation of Illinois Application May 16, 1932, Serial No. 611,544

4 Claims. (Cl. 136—4)

It has been observed that certain types of clinical thermometers are rendered inaccurate when used in a strong electro-magnetic field. Resistance and thermocouple thermometers are particularly affected in this way, and it is these two types of thermometers which are generally used in diathermy treatment where an electromagnetic field is inevitably present due to the high frequency current employed in the treatment. Small diathermy machines do not appreciably affect the accuracy of readings, but the larger machines do. As it has not been precisely understood why the inaccuracies occur in the presence of strong electro-magnetic fields, solution of the problem has been difficult.

The present invention, though founded on the hypothesis that the electro-magnetic energy accompanying the high frequency current generates enough heat in the temperature sensitive element in contact with the patient to render readings inaccurate, is nevertheless not limited to this assumed set of facts. Tests have shown that thermometers, which had previously been erratic in the presence of an electro-magnetic field maintained perfect accuracy when made in accordance with the teachings of the present invention, irrespective of the presence or strength of such a field. The invention, therefore, is to be construed in the light of the results that are obtained and should not be limited to any one hypothesis which at the time appears plausible.

Further and other objects and advantages will become apparent as the disclosure proceeds and the description is read in conjunction with the accompanying drawing, in which Fig. 1 is a side elevational view of a rectal insert embodying the principles of this invention;

Figure 1:
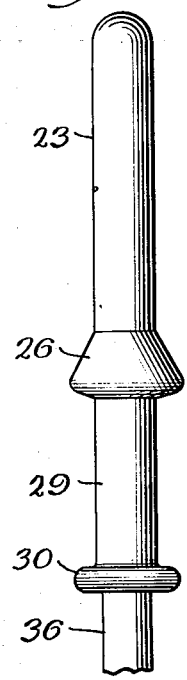
Figure 2:
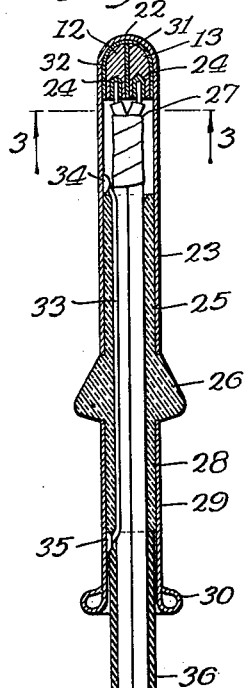
Fig. 2 is a sectional view of the insert shown in Fig. 1 and includes a circuit diagram.
Figure 3:
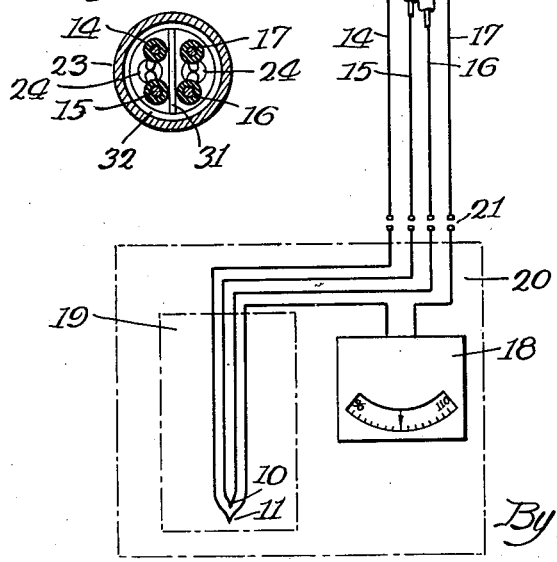
Fig. 3 is a sectional view of the insert taken on the line 3—3 of Fig. 2.

In the preferred embodiment of the invention shown in Figs. 1, 2 and 3, the invention is shown applied to a rectal, thermo-couple, thermometer having two constant temperature junctions 10 and 11 and two variable temperature junctions 12 and 13 connected by conductors 14, 15, 16 and 17 to form a closed circuit. A galvanometer 18 is placed in series with the circuit for recording the flow of current, and is calibrated in degrees Fahrenheit.

The thermocouple junctions 10 and 11 are placed in a constant temperature box 19 adapted to maintain the junctions at a predetermined uniform temperature. As the present invention is not concerned with the means for controlling the temperature of the junctions 10 and 11, further description of the box 19 is believed unnecessary.

The constant temperature box 19 and galvanometer 18 are mounted in a convenient portable unit 20 as indicated in dotted lines in Fig. 2 so that the apparatus may be carried from place to place. The heat sensitive element which is placed in contact with the body of the patient may be detached from the control box at 21.

The variable temperature junctions 12 and 13 comprise semi-cylindrical copper blocks rounded at their upper ends to conform to the semi-spherical end 22 of a metallic sleeve 23 which is preferably made of chromium-plated copper. The copper blocks 12 and 13 are each drilled at 24 to receive the terminals of conductors 14, 15, 16 and 17.

It will be understood that the conductors 14 and 16 have different electrical properties from those of the conductors 15 and 17 and preferably the conductors 14 and 16 are of block copper wire and the conductors 15 and 17 of constantan wire, the latter being an alloy consisting of sixty per cent copper and forty per cent nickel. The terminals of the four conductors are soldered in the recesses 24 of the thermo-couple junctions so that each block has two lead-in wires of different material.

The sleeve 23 telescopically engages a tubular stem 25 of bakelite, or similar material, having an enlargement 26 for assisting in maintaining the insert in place in the patient's rectum. The conductors 14, 15, 16 and 17 are covered with insulation as shown in Fig. 2 and are bound together with friction tape 27 adjacent the thermo-couple junctions.

The stem 25 has a continuation 28 in the rear of the enlargement 26 which carries a sleeve 29 of material similar to that used in the sleeve 23. The outer end of the sleeve 29 is beaded as shown at 30 to prevent injury to the rubber hose 36 encasing the conductors.

The thermo-couple junctions 12 and 13 are insulated from each other by a thin strip of mica 31 and a coating of insulating material 32 interposed between the junctions and the sleeve 23. "Insalute" is a satisfactory material for the coating 32, as it has good dielectric properties and is also a fair conductor of heat—both being desirable properties.

The rectal insert above described is unaffected by strong electro-magnetic fields, while a similar insert without the protecting metallic sleeve is decidedly inaccurate when placed in the same fields. The most plausible explanation of this phenomenon is that the metallic sleeve acts as a shield for the thermo-couple junctions by absorbing the electro-magnetic energy within itself. The heat thus generated in the sleeve is able to be rapidly dissipated by reason of the larger conducting surface of the sleeve. To assist in the dissipation of energy, the sleeves 23 and 29 may be joined by a copper conductor 33 having its ends soldered to the sleeves 23 and 29 at 34 and 35, respectively.

Another possible explanation of the effect of the sleeve 23 is that it acts as a "cooling fin" for the junctions 12 and 13. That is, any heat produced in the thermocouple junction by the strong electromagnetic field is immediately dissipated by the large surface area of the sleeve. The effective area of the sleeve 23 is enhanced by the conductor 33 connecting the sleeve 29 to the sleeve 23.

Regardless of theory, the fact remains that by completely shielding the heat sensitive element from the electro-magnetic field, accurate temperature readings are obtained, while before they were not possible.

Figure 4:
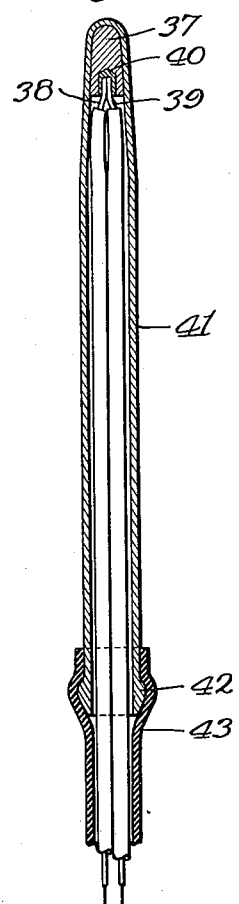
Fig. 4 is a view similar to Fig. 2 but showing a modified form of the invention.

In the modified form of the invention shown in Fig. 4, a single thermo-couple junction 37 is employed into which conductors 38 and 39 are soldered as indicated at 40. As before, one of the two conductors is block copper wire and the other constantan wire. The junction 37 is shielded from undesirable electro-magnetic heating effects by an elongated sleeve 41 preferably of chromium plated copper which terminates with an enlargement 42 over which a rubber hose 43 is adapted to be secured.

The conductors 38 and 39 form a closed circuit including a constant temperature junction 44 housed within a constant temperature unit 45, and a galvanometer 46 calibrated to read in degrees Fahrenheit.

The metallic element 41 absorbs the electromagnetic energy in precisely the same manner as described with reference to the preferred form of the invention which description need not be repeated.

What I claim is:

1. A clinical thermometer adapted to give accurate readings of body temperatures in a strong electro-magnetic field comprising an instrument having a substantially tubular end portion including a metallic sheath having a closed rounded tip, the size and proportions of the end portion being such as to adapt the instrument to be inserted into a body cavity, said instrument having also a handle portion substantially rigid with the end portion, and a metallic heat-sensitive element embedded in the tip in good heat conductive relation with the metallic sheath, said sheath having the property of protecting the heat-sensitive element from undesirable temperature increases resulting from its presence in an electro-magnetic field.

2. A clinical thermometer adapted to give accurate readings of body temperatures in a strong electro-magnetic field comprising an instrument having a substantially tubular end portion including a copper sheath having a closed rounded tip, the size and proportions of the end portion being such as to adapt the instrument to be inserted into a body cavity, said instrument having also a handle portion substantially rigid with the end portion, and a metallic heat-sensitive element embedded in the tip in good heat conductive relation with the copper sheath, said sheath having the property of protecting the heat-sensitive element from undesirable temperature increases resulting from its presence in an electromagnetic field.

3. A clinical thermometer adapted to give accurate readings of body temperatures in a strong electro-magnetic field comprising an instrument having a substantially tubular end portion including a metallic sheath having a closed, rounded tip, the size and proportions of the end portion being such as to adapt the instrument to rectal insertion, said instrument having also a handle portion substantially rigid with the end portion by which it may be held by an operator and an enlargement in the instrument adapted to assist in maintaining the instrument in the rectal cavity, and a metallic heat-sensitive element embedded in the tip in good heat conductive relation with the metallic sheath, said sheath having the property of protecting the heat-sensitive element from undesirable temperature increases resulting from its presence in an electro-magnetic field.

4. A clinical thermometer adapted to give accurate readings of body temperatures in a strong electro-magnetic field comprising an instrument having a substantially tubular end portion including a metallic sheath having a closed rounded tip, the size and proportions of the end portion being such as to adapt the instrument to be inserted into a body cavity, said instrument having also a handle portion substantially rigid with the end portion, the hot junctions of a plurality of thermo-couples embedded in the tip, and insulation separating said junctions from each other and from the metallic sheath, said sheath having the property of protecting the junctions from undesirable temperature increases resulting from their presence in an electro-magnetic field.

MARSHALL N. STATES.